United States Patent [19]
Sidler et al.

[11] 3,917,223
[45] Nov. 4, 1975

[54] SLIDE VALVE HAVING ADJUSTABLE PACKING

[75] Inventors: Hans Sidler, Blumenstein; Hans Stalder, Vorhuben, both of Switzerland

[73] Assignee: Sistag, Maschinenfabrik Sidler Stalder AG, Switzerland

[22] Filed: July 24, 1972

[21] Appl. No.: 274,835

[30] Foreign Application Priority Data
Jan. 5, 1972 Switzerland............................ 106/72

[52] U.S. Cl. ................ 251/214; 137/242; 251/328; 277/129; 277/190
[51] Int. Cl............................................ F16k 31/34
[58] Field of Search.......... 137/246.22, 246.15, 242; 251/214, 328, 170, 171

[56] References Cited
UNITED STATES PATENTS

| | | | |
|---|---|---|---|
| 2,842,283 | 7/1958 | Smith.......................... | 137/246.22 X |
| 3,722,896 | 3/1973 | Tankus................................ | 277/190 |
| 3,829,862 | 4/1958 | Wey..................................... | 251/328 |

FOREIGN PATENTS OR APPLICATIONS

| | | | |
|---|---|---|---|
| 1,059,556 | 11/1953 | France................................ | 251/170 |

*Primary Examiner*—Harold W. Weakley
*Attorney, Agent, or Firm*—McGlew and Tuttle

[57] ABSTRACT

A slide valve comprises a valve housing having a transverse opening defining a flow passage and a slide valve in the housing which is movable upwardly and downwardly to open and close said flow passage. A compressible packing bears against at least one face of the slide preferably at the location of the parting plane between two parts making up the housing. The housing includes an adjustable screw member which extends inwardly from the exterior for the purpose of adjusting the compression on the packing and the force upon which it acts against the slide.

7 Claims, 3 Drawing Figures

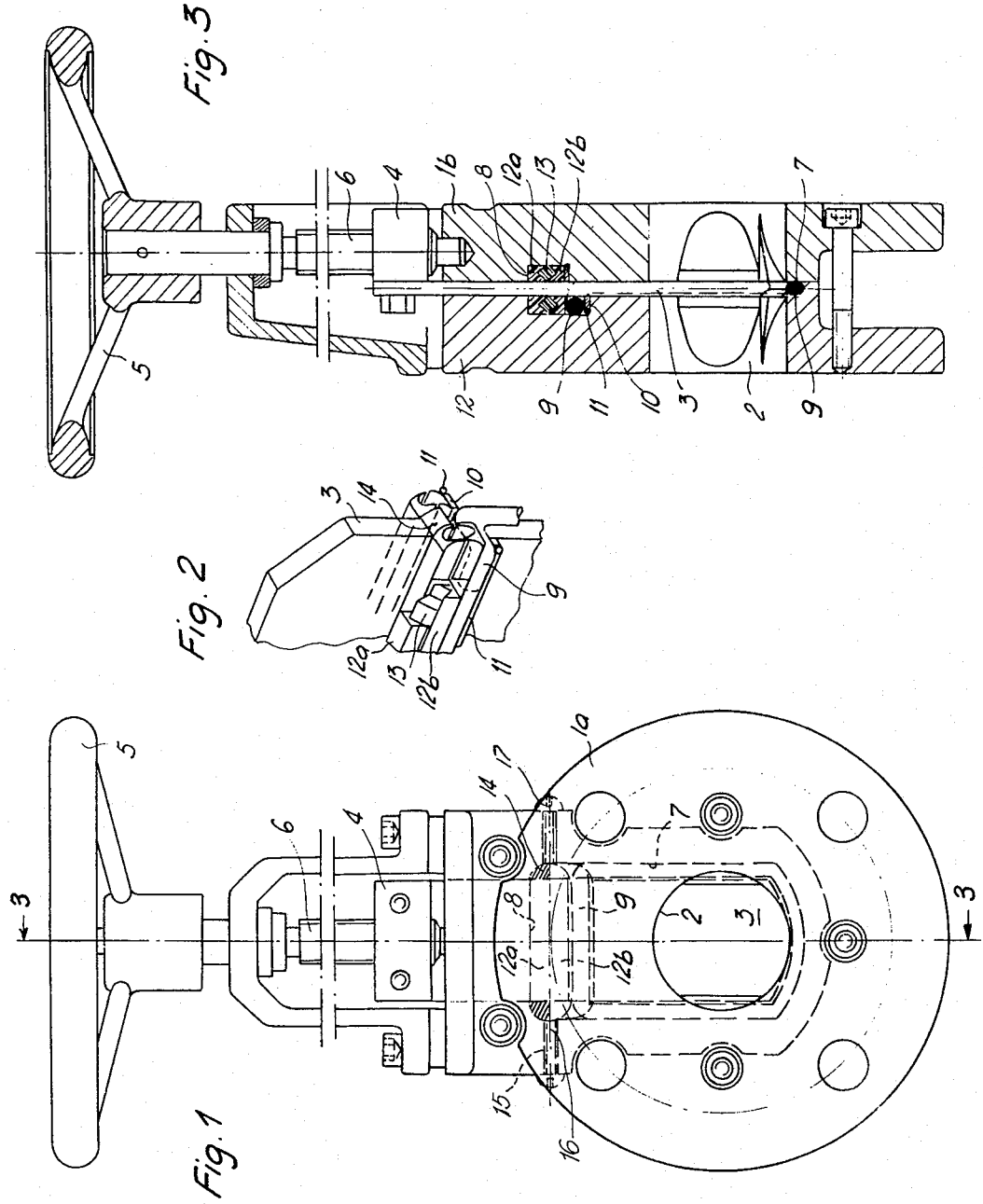

SLIDE VALVE HAVING ADJUSTABLE PACKING

BACKGROUND OF THE INVENTION

1. Field of the Invention

The present invention relates in general to the construction of valves and in particular for a new and useful slide valve having a face which is sealed by a packing with a transversely extending portion which may be adjustably compressed against the valve slide face.

2. Description of the Prior Art

The present invention relates particularly to slide valves and to an improved sealing construction for such valves. The known valves are sealed toward the outside of the housing by a sealing material which surrounds the slide member and works in conjunction with the guidance and closure of the slide. With the known constructions the slide valve is guided by a packing material arranged in a U-shaped groove in the housing at a location such that the sealing insert bears against the slide. The known constructions include a cross groove surrounding half the periphery of the slide member which is provided for a packing or insert which bears against the slide member. A disadvantage in the known construction is that it is difficult to maintain and replace the seal. Adjustment or replacement of the seal is only possible after the parts of the slide valve have been dismantled so that the valve must be taken out of service or at least partially dismantled at the location.

SUMMARY OF THE INVENTION

The present invention provides a slide valve with a slide member which is movable backwardly and forwardly to open and close a flow passage and which is sealed around its periphery from the outside of the housing by a generally U-shaped packing or seal which also includes a transverse portion. The housing includes an adjustment member which makes it possible to adjust the packing particularly the transverse portion without dismantling any of the parts of the slide valve or without taking the valve out of service.

In the preferred construction of the invention the cross seal portion of the packing includes a hollow bar which is divided centrally to carry an elastomeric material with a cavity in which is arranged a compressible packing. The packing is subjected to the compressive action of threaded members or bolts which project through threaded bores of the housing from respective opposite sides and which may bear against the opposite sides under adjustable pressure. Thus if during operation the sealing action falls off it may be corrected immediately by tightening one or the other of the screws and this can be carried out without suspending the operational pressure in the slide valve or dismantling any parts thereof.

The hollow bar is advantageously provided with grooves of V shaped cross section and the segments of the bar advantageously terminate in a narrow lip along which the two parts of the bar touch. The bars are pressed firmly against the slide member to put the packing under pressure. The packing material is located in the cavity in the bar formed by two V shaped grooves in a construction which prevents extrusion of the packing material through the dividing slit in the hollow bar.

The hollow bars which carry the packing material advantageously extend to each side of the slide plate member and in this area they are formed as a segment of a circle with an opening therethrough which is blocked off by a packing insert shaped to conform to the geometry of the hollow bars.

In accordance with a further feature of the invention the housing of the valve is divided in the plane of the slide plate so that only one part of the housing has to be machined to form a guide channel for the slide plate.

Accordingly it is an object of the invention to provide a slide valve which includes a slide member which is movable backwardly and forwardly to close and open a through flow passage of the valve housing and which is sealed on at least one side by a U shaped packing which has a portion which extends transversely and is maintained in sealing engagement with a side face of the slot member, and which includes means for adjusting the bearing pressure of the sealing member.

A further object of the invention is to provide a slide valve construction which is simple in design, rugged in construction and economical to manufacture.

For an understanding of the principles of the invention, reference is made to the following description of a typical embodiment thereof as illustrated in the accompanying drawing.

BRIEF DESCRIPTION OF THE DRAWINGS

In the Drawings:

FIG. 1 is a front elevational view of a slide valve construction in accordance with the invention;

FIG. 2 is an enlarged partial front end perspective view of the slide valve member and the packing seal construction for the valve shown in FIG. 1; and FIG. 3 is a section taken along the line 3—3 of FIG. 1.

GENERAL DESCRIPTION OF THE PREFERRED EMBODIMENT

Referring to the drawings in particular, the invention embodied therein comprises a slide valve having a housing made up of two parts 1a and 1b which are bolted together and which include a transversely extending opening defining a cylindrical flow passage 2. The slide member in the form of a plate 3 is guided in a guide channel defined in one part of the housing and it is fixed at its top to a drive nut 4 which is threaded to a threaded spindle 6 for axial movement therealong upon rotation of a hand wheel 5. The hand wheel 5 is locked against axial displacement and is affixed to the spindle 6 to permit shifting of the nut 4 and the slide valve for opening and closing the flow passage 2.

In accordance with one feature of the invention the plane of division of the housing into the parts 1a and 1b is coextensive with one face of the slide plate 3 so that only one part of the housing has to be machined to form the guide channel for the plate. A substantially U shaped sealing groove 7 is provided in the machined part of the housing and it includes lateral portions which open up into a lower portion of each end of a cross groove 8 which extends transversely around one side of the slide plate 3. The groove also continues in the other part of the housing part 1b.

In accordance with a feature of the invention the cross groove 8 has a substantially rectangular cross section and extends along the broad face of the slide plate and it is semicircular in cross section as shown in FIG. 1 at each end of the plate. A sealing ring 9 made of an elastomeric material is inserted into the groove 7 and in the lower portion of the part of the cross groove 8 which is located in the housing part 1a.

The slide plate which is slightly curved on its bottom edge is formed with relatively sharp corners so that its movement will effect a self cleaning action on the plate because these sharp corners act as scavenging corners from which any material which tends to stick to the plate is scoured by the flow in the passage of the slide valve. In addition the shape of the lower edge of the slide plate squeezes out the flow medium in the lower part of the U shaped section seal 9 by a guillotine-like action.

On the inner or flow side of the wall of the cross groove 8 are located scraper members 10 which are pressed against the side faces of the slide plate 3 by an elastomeric ring 11. The scraper members 10 prevent particles from the flow medium from sticking to the plate 3 and prevent the penetration of the particles into the cross seal when the slide valve is open. On each side of the plate 3 this cross seal has a two part hollow bar including a part 12a on one side and a part 12b spaced laterally on the other side and each being made of an elastomeric material. The parts or segments of the hollow bar 12a and 12b which presents a V shaped groove in cross section rest on one another along their lips are adjacent to the grooves and which end in a narrow face so that a diamond shaped cavity is formed into which is inserted a plastic compressible packing material 13. This packing material 13 may comprise for example a paste or mastic formed by asbestos fibers. The compressibility of the paste or mastic arises from the permanently existing air pockets therein. The plastic packing material 13 is advantageously formed in diamond shaped strips which may be introduced into the cavity in the hollow bar on the initial insertion thereof or when replenishing becomes necessary by means of a suitable tamper.

The hollow bars 12a and 12b include inner lip portions which press against the slide plate and the partially circular ends of the bars project beyond the plate into the narrow sided portions of the cross groove 8. The free space between these projecting portions of the upper parts of the hollow bars 12a at the narrow edge contains a partly circular sealing insert 14 and a seal which completely surrounds the slide plate is formed by the parts 12a and 14.

The cavities of the hollow bars 12a and 12b which are filled with the packing material 13 are lined with threaded holes 15 which are provided in the housing parts 1a and 1b on each side thereof. Adjustment bolts or threaded members 17 are engaged through the threaded bores 15 and they apply a pressure to the packing substance 13 through interposed sealing pads 16. The threaded bolts 17 are threaded in a tightening direction against the sealing pads to compress the packing substance 13 so that the lips of the hollow bars 12a and 12b which are disposed against the slide plate are pressed against the plate to form a tight seal. This contact pressure also prevents packing material 13 from emerging from the cavity in the bars 12a and 12b so that there is no danger that it will escape toward the inside or outside along the face of the plate.

The slide valve is of very simple construction and it guarantees not only impeccable sealing of the slide plate but also a seal which can be adjusted at any time even when the full operational pressure prevails in the pressure of the slide valve. The adjusting may be made by simple adjusting the positon of the adjustment bolt 17.

While a specific embodiment of the invention has been shown and described in detail to illustrate the application of the principles of the invention, it will be understood that the invention may be embodied otherwise without departing from such principles.

What is claimed is:

1. A slide valve comprising a valve housing having a transverse opening defining a flow passage, a slide valve inset housing movable back and forth to open and close said flow passage, a compressible packing means bearing at least against one face of said slide, and an adjustment member extending into said housing and bearing against said packing means and being adjustable to move said packing means to apply a predetermined pressure against said slide, said packing means including a hollow bar of elastomeric material which is divided in its central transverse plane to define a cavity, a compressible packing material in said cavity, said adjustment member being engageable with said compressible packing material, and a sealing pad disposed between said adjustment member and said compressible packing material, said hollow bars projecting beyond each end of said slide valve, said valve comprising a flat plate, said hollow bars having a semicircular portion at each end, a similarly partly circular insert arranged between said bar semicircular end portions.

2. A slide valve according to claim 1, wherein said housing includes a U shaped groove around the periphery of said slide valve and a transversely extending annular groove joining the upper ends of said U shaped groove carrying said packing means.

3. A slide valve according to claim 2, and including a U shaped sealing ring arranged in said transversely extending annular groove.

4. A slide valve according to claim 3, wherein said slide valve comprises a flat plate having a curved bottom edge with sharp corners forming scavenging corners.

5. A slide valve according to claim 3, wherein said U shaped sealing ring extends through said packing means, said packing means comprising a hollow bar having a compressible material therein.

6. A slide valve comprising a valve housing formed of two interengageable relatively flat parts having a transverse opening extending therethrough defining a flow passage, a slide valve arranged for vertical up and downward movement in the parting plane of said two housing parts, means connected to said slide valve for moving it upwardly and downwardly, said housing having a substantially U shaped annular cross groove extending around the periphery of said slide valve at the lower end thereof and including a transversely extending portion above the transverse opening, a transversely extending compressible packing means disposed in said transversely extending portion of said groove, said packing means including a hollow elastic material bar, and a segmental compressible material in said bar, and an adjustment member mounted on said housing and engageable with the compressible material for varying the sealing force of said packing material against said slide valve.

7. A slide valve according to claim 6, wherein said slide valve comprises a flat plate having relatively narrow side edges, said packing means including a semi circular cross-sectional segmental portion at each end of said slide valve flat plate.

* * * * *